(12) United States Patent
Nguyen et al.

(10) Patent No.: US 7,098,726 B2
(45) Date of Patent: Aug. 29, 2006

(54) METHOD AND APPARATUS FOR OPERATING A VOLTAGE REGULATOR BASED ON OPERATION OF A TIMER

(75) Inventors: Don J. Nguyen, Portland, OR (US); Thovane Solivan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/884,520

(22) Filed: Jul. 1, 2004

(65) Prior Publication Data

US 2004/0232975 A1 Nov. 25, 2004

Related U.S. Application Data

(62) Division of application No. 10/197,545, filed on Jul. 15, 2002, now Pat. No. 6,784,647.

(51) Int. Cl.
*G05F 3/02* (2006.01)
(52) U.S. Cl. .................. 327/536; 323/259; 323/344
(58) Field of Classification Search ............ 323/255, 323/259, 268, 271, 282, 285, 344, 350; 327/536, 327/537
See application file for complete search history.

(56) References Cited

U.S. PATENT DOCUMENTS

| | | | | |
|---|---|---|---|---|
| 4,933,579 A | * | 6/1990 | Isobe et al. ................. 327/166 |
| 4,947,309 A | * | 8/1990 | Jonsson ....................... 323/235 |
| 5,414,341 A | | 5/1995 | Brown | |
| 5,747,958 A | | 5/1998 | Van Der Broeck | |
| 5,757,173 A | * | 5/1998 | Agiman ....................... 323/282 |
| 5,889,392 A | * | 3/1999 | Moore et al. ............... 323/282 |
| 5,959,441 A | * | 9/1999 | Brown ....................... 323/282 |
| 6,130,824 A | | 10/2000 | Hosotani | |
| 6,201,743 B1 | * | 3/2001 | Kuroki ....................... 365/194 |
| 6,215,288 B1 | * | 4/2001 | Ramsey et al. ............. 323/224 |
| 6,366,066 B1 | * | 4/2002 | Wilcox ....................... 323/282 |
| 6,489,808 B1 | * | 12/2002 | Iizuka ......................... 326/56 |
| 6,600,797 B1 | | 7/2003 | Hasegawa | |
| 6,653,873 B1 | * | 11/2003 | Nguyen ....................... 327/112 |
| 6,696,825 B1 | * | 2/2004 | Harris et al. ................ 323/282 |
| 6,753,723 B1 | * | 6/2004 | Zhang ......................... 327/540 |
| 2001/0043095 A1 | * | 11/2001 | Taniguchi .................... 327/112 |
| 2002/0175661 A1 | * | 11/2002 | Wheeler et al. ............ 323/282 |
| 2002/0185994 A1 | * | 12/2002 | Kanouda et al. ........... 323/282 |
| 2003/0231012 A1 | * | 12/2003 | Corva et al. ................ 323/285 |
| 2003/0234636 A1 | * | 12/2003 | Ruan et al. ................. 323/271 |

* cited by examiner

*Primary Examiner*—Terry D. Cunningham
(74) *Attorney, Agent, or Firm*—Blakely, Sokoloff, Taylor & Zafman LLP

(57) ABSTRACT

In accordance with an embodiment of the disclosed matter, a voltage regulator may supply power to a component within a computer system. A timer may be provided. The voltage regulator may operate synchronously, and when the timer expires the voltage regulator may operate non-synchronously. For one embodiment, the voltage regulator may operate non-synchronously when the timer expires and the component is in a sleep state.

12 Claims, 5 Drawing Sheets

METHOD AND APPARATUS FOR OPERATING A VOLTAGE REGULATOR BASED ON OPERATION OF A TIMER

This is a Divisional of U.S. Pat. application Ser. No. 10/197,545, filed on Jul. 15, 2002 now U.S. Pat. No. 6,784,647.

An embodiment of the disclosed matter relates to computer systems and more particularly to adjusting the operation of a voltage regulator depending on a signal that indicates the status of a timer.

BACKGROUND

Computer systems are becoming increasingly pervasive in our society, including everything from small handheld electronic devices, such as personal data assistants and cellular phones, to application-specific electronic devices, such as set-top boxes, digital cameras and other consumer electronics, to medium-sized mobile systems such as notebook and tablet computers, to desktop systems, workstations, and servers. Computer systems typically include one or more processors. A processor manipulates and controls the flow of data in a computer by executing instructions. To provide more powerful computer systems for consumers, processor designers strive to continually increase the operating speed of the processor. Unfortunately, as processor speed increases, the power consumed by the processor tends to increase as well.

Historically, the power consumed by a computer system has been limited by two factors. First, as power consumption increases, the computer tends to run hotter, leading to thermal dissipation problems. Second, the power consumed by a computer system may tax the limits of the power supply used to keep the system operational, reducing battery life in mobile systems and diminishing reliability while increasing cost in larger systems.

One method of reducing the amount of power consumed by a computer system is to design the system such that it is capable of operating in two different states. In a first state of operation, only the most vital functions of the system, such as those dedicated to monitoring for user input, may be active. This may be referred to as a "sleep state." During the sleep state, the computer system may consume very little power from a voltage regulator (alternatively referred to as a power supply, power source, voltage supply, voltage source, Vcc supply, or Vcc source). In a second state of operation, the computer system may be busy executing instructions to accomplish a particular task. This may be referred to as a "wake state." During the wake state, the computer system may consume a greater amount of power from the voltage regulator. Various components of the computer system similarly operate in sleep and wake states. The definition of these states, with respect to the individual components, may be particular to the design and function of the components.

Unfortunately, various components of a computer system, such as the voltage regulator, may be designed to operate more efficiently during one state than during another. This may result in poor average power consumption over an extended period of time.

One or more embodiments of the disclosed matter may address one or more of these issues.

BRIEF DESCRIPTION OF THE DRAWINGS

Embodiments are illustrated by way of example and not limitation in the accompanying figures in which like references may indicate similar elements and in which.

DETAILED DESCRIPTION

Figure 1:
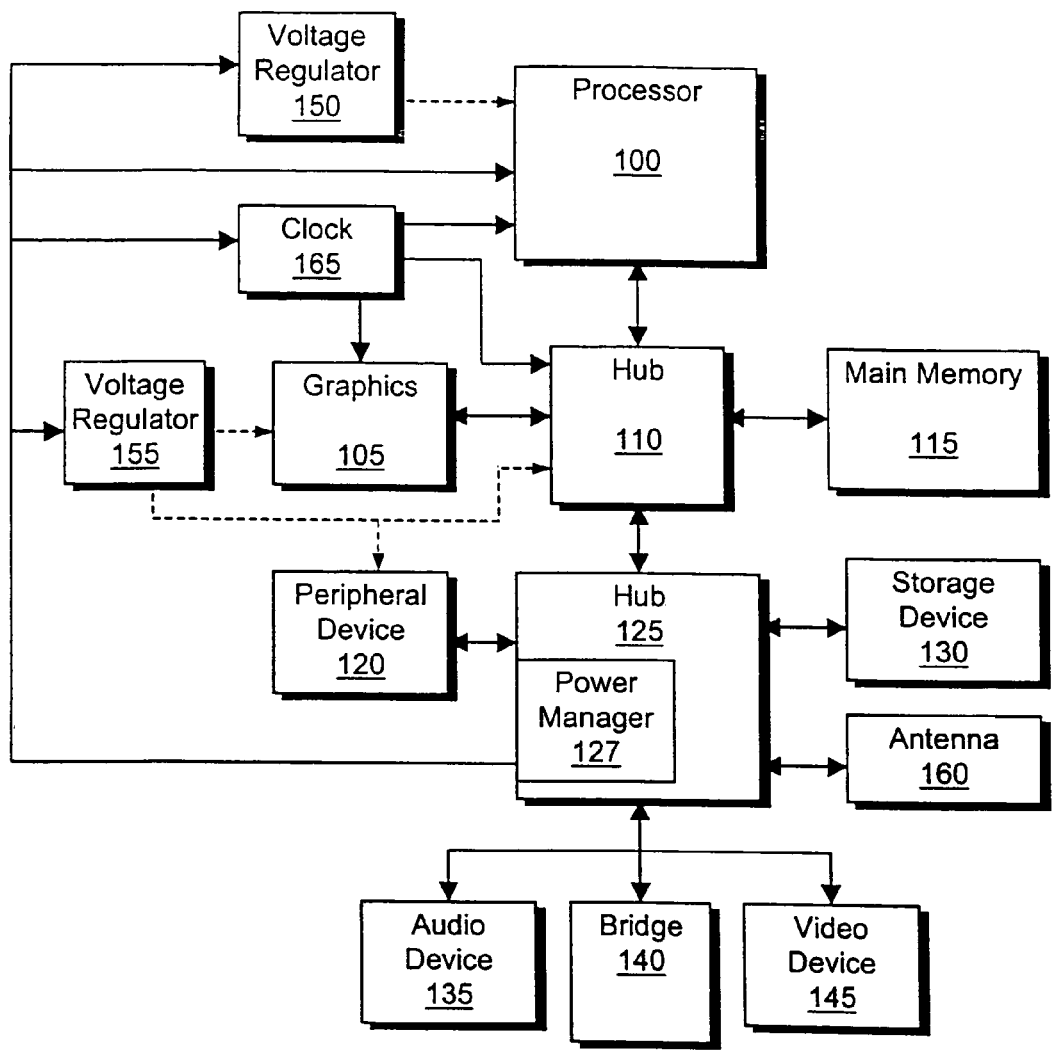
FIG. 1 includes an example of a computer system.

In accordance with an embodiment of the disclosed matter, a voltage regulator may supply power (alternatively referred to as a supply voltage or Vcc) to a component (or to multiple components) within a computer system. The voltage regulator may include a timer. A power manager of the computer system may provide a power state signal to the voltage regulator indicating the power state of the component (or of multiple components). The voltage regulator may operate synchronously or non-synchronously depending on the timer and the power state signal.

For example, for one embodiment, the voltage regulator may operate synchronously when the power state signal indicates that the component is in a wake state, regardless of the status of the timer. The voltage regulator may also operate synchronously before the timer expires (i.e. when the timer is set or is running), even when the power state signal indicates that the component is in a sleep state. If, however, the power state signal indicates that the component is in a sleep state and the timer expires, a pull-down power transistor of the voltage regulator may be turned off, causing the voltage regulator to operate non-synchronously during the period of time in which pull-up and pull-down power transistors of the voltage regulator are both turned off.

A more detailed description of embodiments of the disclosed matter, including various configurations and implementations, is provided below.

As used herein, the terms "wake" and "sleep" are relative indications of the power state of one or more components of a computer system. A component in a wake state may generally consume more power, on average, than the same component in a sleep state. In accordance with one embodiment, a component in a wake state may be either in an operational state or is ready for operation (i.e. receiving, transmitting, or accessing data or ready to receive, transmit, or access data). A component in a sleep state may be in a non-operational state. For example, a component that manipulates or communicates data utilizing an internal clock signal for synchronization may be considered to be in a wake state while the internal clock is running and in a sleep state while the internal clock is stopped.

For one embodiment, the terms "wake" and "sleep" may be interpreted in accordance with the ACPI specification (Advanced Configuration and Power Interface Specification, Rev. 2.0, published Jul. 27, 2000, by Compaq, Intel, Microsoft, Phoenix, and Toshiba), but is not to be so limited. Note that what is referred to herein as a sleep state may alternatively be referred to as an inactive, power-down, deep power-down, deep sleep, low power, suspend, or idle state.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur.

FIG. 1 includes an example of a computer system. As shown, the computer system may include a processor 100 coupled to hub 110. Voltage regulator 150 may supply power to processor 100, and clock 165 may provide a clock signal to processor 100. Processor 100 may communicate with graphics controller 105, main memory 115, and hub 125 via hub 110. Hub 125 may couple peripheral device 120, storage device 130, audio device 135, video device 145, antenna 160, and bridge 140 to hub 110. Voltage regulator 155 may supply power to graphics controller 105, peripheral device 120, and hub 110.

Audio device 135 of FIG. 1 may include, for example; a speaker, a microphone, or other input/output device. Video device 145 may include, for example, a display screen, a camera, or other video input/output device. Bridge 140 may couple hub 125 to one or more additional buses coupled to one or more additional peripheral devices. Antenna 160 may couple the computer system to one or more wireless networks in accordance with one or more wireless communication protocols. Peripheral device 120 may be one or more other peripheral devices.

Hub 125 of FIG. 1 may include a power manager 127. Power manager 127 may send power state signals to voltage regulators 150 and 155, processor 100 and clock 165. These power state signals may be in accordance with ACPI states and signals. Power state signals may indicate the power states of one or more components of the computer system. In accordance with an alternate embodiment, power manager 127 may reside within a different component of the computer system, may be a discrete component, or may be distributed among multiple components of the computer system. For example, each component coupled to a voltage regulator may send its own power state signal separately to the voltage regulator to indicate its power state. The power state signal may indicate a power state transition of an associated component (or of multiple components) before, after, or during the power state transition of the component.

In accordance with an embodiment, a computer system may include more or fewer components than those shown in FIG. 1, and the components of FIG. 1 may be partitioned differently. For example, multiple components may be integrated into a single component, and single components may be divided into multiple components. Note that the term "processor" may be used herein to refer to one or more of a central processing unit, a processor of a symmetric or asymmetric multiprocessing system, a digital signal processor, a micro-controller, etc.

Multiple components of the computer system of FIG. 1 may be capable of entering wake and sleep states. For example, processor 100 may have a fully operational wake state, a partially operational wake state, a partial sleep state, a regular sleep state, a deeper sleep state, etc. Similarly, graphics controller 105 and hubs 110 and 125 may have multiple wake and sleep states.

Figure 2A:
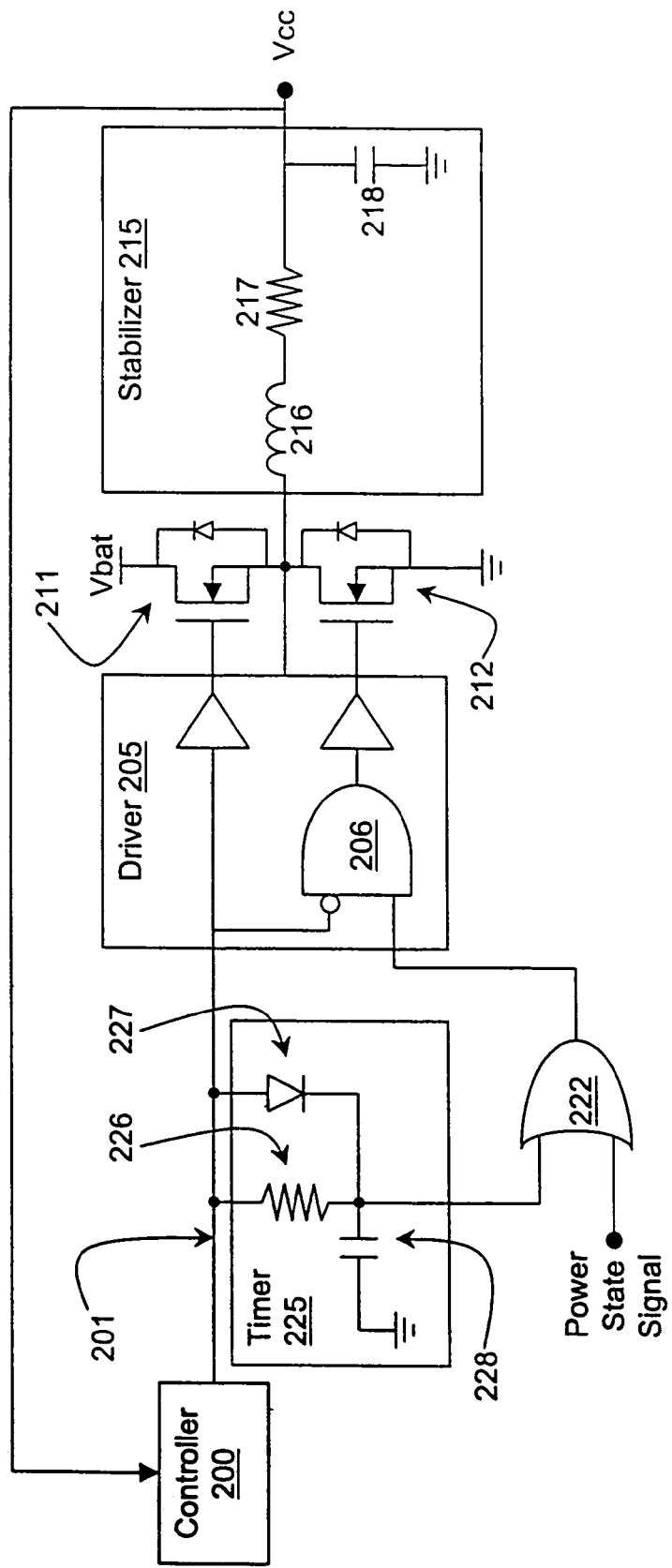
FIGS. 2A and 2B include examples of voltage regulators.

FIG. 2A includes an example of a switching voltage regulator in accordance with an embodiment of the disclosed matter. The voltage regulator of FIG. 2A may supply power to one or more components of a computer system, such as a processor. As shown, the voltage regulator includes a controller 200 to control the switching of pull-up power transistor 211 and pull-down power transistor 212 to set the appropriate supply voltage, Vcc. When turned on, pull-up power transistor 211 pulls the output supply voltage, Vcc, up toward Vbat, which may be, for example, a battery voltage or other voltage that is higher than Vcc. Pull-down power transistor 212 pulls the output supply voltage down toward ground when turned on. The supply voltage, Vcc, may be fed back to controller 200 for comparison to a reference voltage to maintain a target voltage level.

Driver 205 of FIG. 2A may operate the power transistors according to a switching signal provided via switching signal line 201 from controller 200. Switching signal line 201 may be coupled to the gate of pull-up power transistor 211 to control pull-up power transistor 211 according to the switching signal. Driver 205 may include AND gate 206 having an inverting input coupled to switching signal line 201 and a non-inverting input coupled to an output of OR gate.

The voltage regulator of FIG. 2A may additionally include timer 225 coupled to switching signal line 201 to receive the switching signal from controller 200. Timer 225 may include resistor 226 in parallel with diode 227 coupled to switching signal line 201 at a first end and coupled to capacitor 228 at a second end. The other end of capacitor 228 may be coupled to ground. The output of timer 225 may be provided at the node to which resistor 226, diode 227, and capacitor 228 are coupled, and this node may be coupled to an input of OR gate.

The other input of OR gate of FIG. 2A may receive a power state signal. The power state signal may be provided to an input port of the voltage regulator from, for example, a power manager of the computer system via a signal line coupled between the power manager and the voltage regulator. In accordance with an embodiment of the disclosed matter, the power state signal may be logically high when a component powered by the voltage regulator is in a wake state, and logically low when the component is in a sleep state.

The output of AND gate 206 may be coupled to the gate of pull-down power transistor 212. The node between pull-up and pull-down power transistors 211 and 212 may be fed back to driver 205 and coupled to stabilizer circuit 215. Stabilizer circuit 215 may include inductor 216, resistor 217, and capacitor 218 to stabilize and smooth the output supply voltage Vcc by eliminating ripples created by the switching of power transistors 211 and 212.

In accordance with alternate embodiments, a voltage regulator may be defined to include more or fewer circuit elements than those shown in FIG. 2A, and the voltage regulator of FIG. 2A may be partitioned differently. For example, multiple elements may be integrated into a single component, and single elements may be divided into multiple components.

In accordance with one embodiment of the disclosed matter, when the switching signal on switching signal line 201 of FIG. 2A is logically high, pull-up power transistor 211 is turned on, and timer 225 may be set by charging capacitor 228 via forward-biased diode 227. Once capacitor 228 is charged, the output of timer 225 may be logically high. When the switching signal transitions to a logically low value, pull-up power transistor 211 is turned off, and timer 225 is started. When timer 225 is started, capacitor 228 may initially remain charged, reverse biasing diode 227 and keeping the output of timer 225 logically high for a period of time. Eventually, however, the charge on capacitor 228 may drain through resistor 226 to switching signal line 201. The output of timer 225 may then fall to a logically low level. Timer 225 may again be set when the switching signal transitions back to a logically high level.

In accordance with one embodiment of the disclosed matter, timer 225 of FIG. 2A may be set and started by the switching signal on switching signal line 201. Once started, timer 225 expires when its output signal decays from a logically high level to a logically low level. For this embodiment, the length of time it takes for the output of timer 225 to transition to a logically low level after the timer is started is referred to as the duration, and timer 225 may be tuned to establish a desired duration.

Timer 225 may be tuned to establish a desired duration by selecting discrete elements having an appropriate resistance for resistor 226 and capacitance for capacitor 228. For one embodiment, resistor 226 may be a digital resistor, and timer 225 may be tuned by entering an appropriate value in a memory region that determines the resistance of resistor 226. For another embodiment, timer 201 may be a digital counter, and the timer may be tuned by entering an appropriate value in a memory region that sets the limit of the counter.

AND gate 206 of FIG. 2A may act as a pass gate. AND gate 206 may allow an inverse of the switching signal that controls pull-up power transistor 211 to control pull-down power transistor 212 depending on the signal provided to the non-inverting input of AND gate 206. For example, when the output of OR gate is logically high, the signal at the inverting input to AND gate 206 may be allowed to pass through to the gate of pull-down power transistor 212. Under these conditions, power transistors 211 and 212 operate synchronously at a switching frequency determined by controller 200. Thus, the voltage regulator operates synchronously if either (or both) the power state signal is logically high (indicating that the associated component is in a wake state) or the output of timer 225 is logically high (indicating that the timer is set or is running).

Conversely, when the signal provided at the output of OR gate is logically low, the switching signal at the inverting input to AND gate 206 of FIG. 2A is prevented from passing through to the gate of pull-down power transistor 212. Under these conditions, pull-down power transistor 212 is turned off, causing the pull-up and pull-down power transistors to operate non-synchronously during the period of time in which the pull-up and pull-down power transistors are both turned off. Thus, the voltage regulator operates non-synchronously if both the power state signal is logically low (indicating that the associated component is in a sleep state) and the output of timer 225 is logically low (indicating that the timer has expired).

In accordance with an embodiment of the disclosed matter, current may flow through inductor 216 of FIG. 2A towards the Vcc output of the voltage regulator when the component powered by the voltage regulator is in a wake state. This is referred to as a positive flow of current through the inductor. When the component is in a sleep state, current may flow in a positive direction through inductor 216 when pull-up power transistor 211 is turned on. Current may also flow in the positive direction when the component is in a sleep state and pull-down power transistor 212 is initially turned on. For one embodiment, when there is a positive flow of current through the inductor, the voltage regulator may be operated synchronously.

Eventually, however, current may flow in the opposite direction through the inductor (i.e. negative flow) when pull-down power transistor 212 of FIG. 2A is turned on and the component is in a sleep state. For one embodiment, if there is a negative flow of current through the inductor, the voltage regulator may be operated non-synchronously by turning off pull-down power transistor 212 (in addition to pull-up power transistor 211). For this embodiment, it may be desirable to tune timer 225 to establish a duration associated with a positive flow of current through inductor 216. In this manner, the expiration of timer 225 may coincide with the change in the direction of the flow of current through the inductor, from a positive flow to a negative flow. Thus, the voltage regulator may operate synchronously before the timer expires and non-synchronously when the timer expires. Turning off the pull-down power transistor when there is a negative flow of current through the inductor may improve the power conversion efficiency of the voltage regulator, thereby reducing the amount of power consumed by the voltage regulator.

Figure 2B:
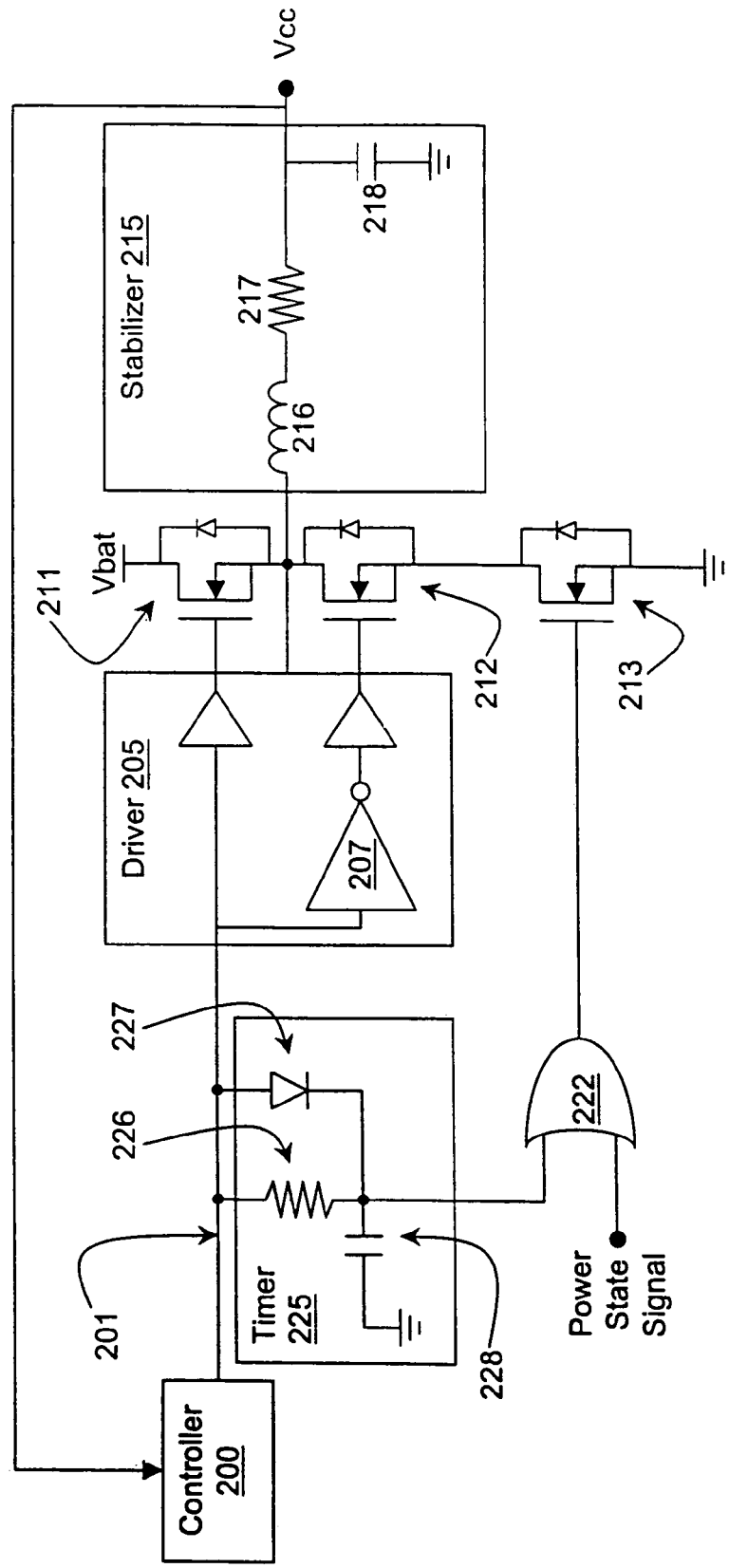

FIG. 2B includes an example of a switching voltage regulator in accordance with an alternate embodiment of the disclosed matter. The voltage regulator of FIG. 2B may be similar to the voltage regulator of FIG. 2A. The voltage regulator of FIG. 2B, however, includes an additional pull-down power transistor 213 having a gate coupled to the output of OR gate. In addition, driver 205 includes inverter 207 to replace the inverting input of AND gate 206 of FIG. 2A. The input to inverter 207 is coupled to switching signal line 201, and the output of the inverter is coupled to the gate of pull-down power transistor 212.

The voltage regulator of FIG. 2B may operate in much the same way as the voltage regulator of FIG. 2A described above. For the embodiment of FIG. 2B, however, pull-down power transistor 212 may operate synchronously with pull-up power transistor 211 regardless of the signal provided at the output of OR gate. The power transistors collectively, however, operate non-synchronously when the output of OR gate is logically low. When the output of OR gate is logically low, pull-down power transistor 213 may be turned off, causing the voltage regulator to operate non-synchronously during a period of time in which pull-up and pull-down power transistors are both turned off.

Figure 3:
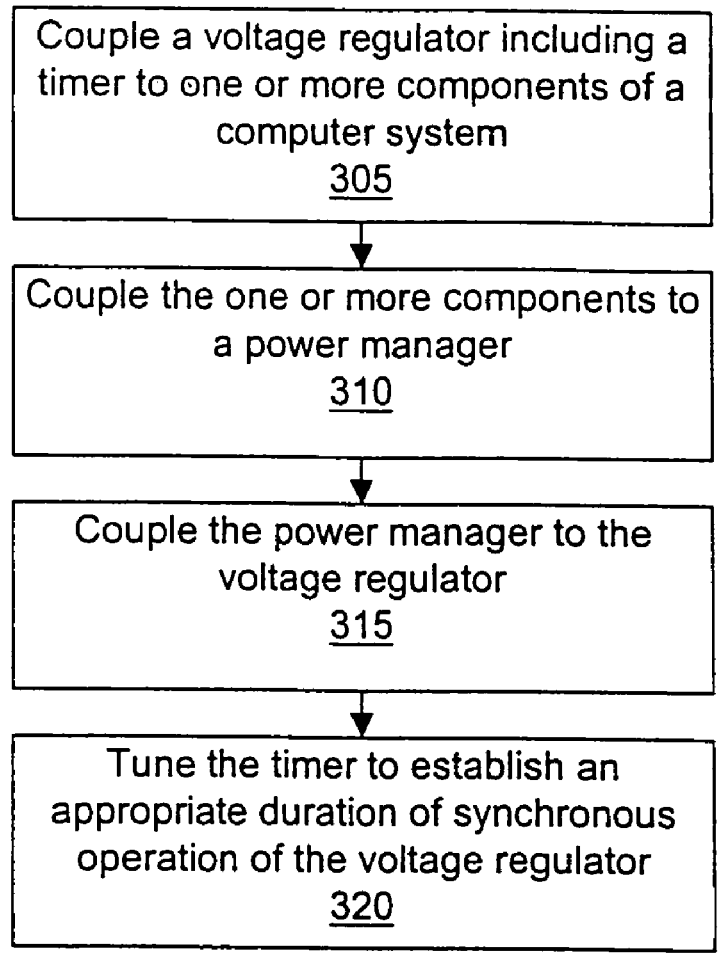
FIG. 3 includes a flow chart.

In accordance with an embodiment of the disclosed matter, a voltage regulator is coupled to one or more components of a computer system to supply power to the one or more components of the computer system at block 305 of FIG. 3. The voltage regulator may include a timer. At block 310 the one or more components are coupled to a power manager of the computer system, and at block 315 the power manager is coupled to the voltage regulator. At block 320 the timer of the voltage regulator may be tuned to establish an appropriate duration of synchronous operation of the voltage regulator. In accordance with one embodiment, the appropriate duration of synchronous operation of the voltage regulator is associated with a positive flow of current through an inductor of the voltage regulator.

Figure 4:
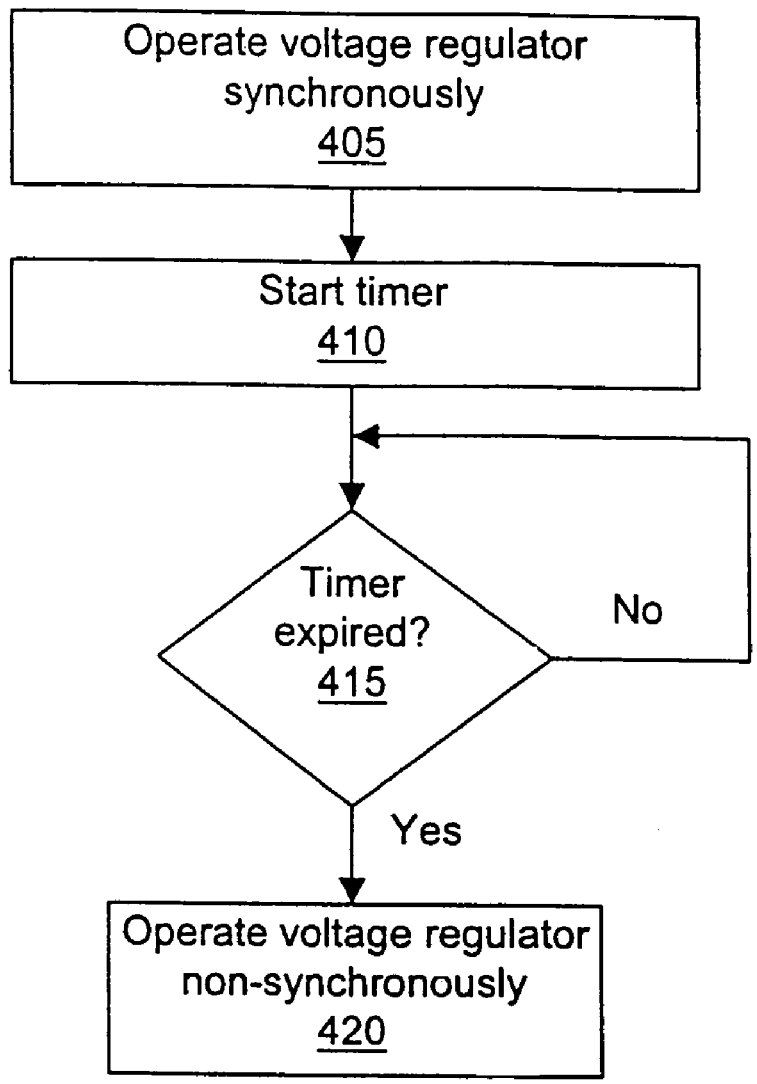
FIG. 4 includes a flow chart.

In accordance with an embodiment of the disclosed matter, a voltage regulator is operated synchronously at block 405 of FIG. 4. For one embodiment, a timer may be set when a pull-up power transistor of the voltage regulator is turned on. At block 410 the timer is started. In accordance with an embodiment of the disclosed matter, the timer may be started when a pull-down power transistor of the voltage regulator is turned on (and a pull-up power transistor is turned off). At block 415 the timer runs for a duration that may be established by prior tuning of the timer. When the timer expires at block 415, the voltage regulator is operated non-synchronously at block 420.

The disclosed subject matter has been described with reference to specific embodiments thereof. It will, however, be evident to persons having the benefit of this disclosure that various modifications and changes may be made to these embodiments without departing from the broader spirit and scope of the invention as set forth in the appended claims and their equivalents. The specification and drawings are, accordingly, to be regarded in an illustrative rather than a restrictive sense.

The invention claimed is:

1. A computer system comprising:
   a component; and
   a voltage regulator to generate a supply voltage for the component based on a switching signal comprising a plurality of cycles, each of the plurality of cycles comprising a first state and a second state, said voltage regulator including
   a timer to restart for at least a portion of the plurality of cycles, wherein a duration of the timer is associated with a flow of current through a stabilizer circuit of the voltage regulator, and the stabilizer circuit includes an inductor, and
   a plurality of power transistors to couple the supply voltage to a source voltage and decouple the supply voltage from a ground during the first state of each of the plurality of cycles, and, during the second state of each of the plurality of cycles, to decouple the supply voltage from the source voltage and couple the supply voltage to the ground before the timer expires, and decouple the supply voltage from both the source voltage and the ground when the timer expires.

2. The computer system of claim 1, wherein the stabilizer circuit further includes a capacitor and a resistor to establish the duration of the timer.

3. The computer system of claim 1, further comprising a power manager to provide a power state signal to the voltage regulator, the power state signal to indicate a power state of the component.

4. The computer system of claim 3, wherein the timer is enabled when the component is in a sleep state as indicated by the power state signal.

5. The computer system of claim 4, wherein the timer is disabled when the component is in a wake state as indicated by the power state signal.

6. The computer system of claim 5, wherein the timer is tuned to establish the duration associated with a positive flow of current through the inductor.

7. The computer system of claim 1, wherein the component is a processor.

8. A method comprising:
   receiving a switching signal comprising a plurality of cycles at a voltage regulator having a timer, each of the plurality of cycles comprising a first state and a second state;
   restarting the timer for at least a portion of the plurality of cycles, wherein a duration of the timer is associated with a flow of current through a stabilizer circuit of the voltage regulator, and the stabilizer circuit includes an inductor;
   during the first state of each of the plurality of cycles, coupling a supply voltage from the voltage regulator to a source voltage and decoupling the supply voltage from a ground; and
   during the second state of each of the plurality of cycles, decoupling the supply voltage from the source voltage and coupling the supply voltage to the ground before the timer expires, and decoupling the supply voltage from both the source voltage and the ground when the timer expires.

9. The method of claim 8, further comprising tuning the timer to establish the duration during the second state of each of the plurality of cycles.

10. The method of claim 8, further comprising:
    receiving a power state signal at the voltage regulator, said power state signal to indicate a power state of a component coupled to receive the supply voltage from the voltage regulator;
    enabling the timer when the power state is a sleep state; and disabling the timer when the power state is a wake state.

11. The method of claim 10, wherein the component is a processor of a computer system.

12. The method of claim 10, wherein the power state signal is to indicate a power state of a plurality of components.

* * * * *